(12) United States Patent
Leibler et al.

(10) Patent No.: US 8,049,814 B2
(45) Date of Patent: Nov. 1, 2011

(54) HOLOGRAPHIC MICROSCOPE

(75) Inventors: Stanislas Leibler, New York, NY (US);
Seppe Kuehn, New York, NY (US); Zak Frentz, Queens, NY (US); Doeke Hekstra, New York, NY (US)

(73) Assignee: The Rockefeller University, New York, NY (US)

( * ) Notice: Subject to any disclaimer, the term of this patent is extended or adjusted under 35 U.S.C. 154(b) by 839 days.

(21) Appl. No.: 12/056,978

(22) Filed: Mar. 27, 2008

(65) Prior Publication Data
US 2009/0244667 A1    Oct. 1, 2009

(51) Int. Cl.
*H04N 5/225*    (2006.01)
*H04N 5/89*    (2006.01)
(52) U.S. Cl. ............ 348/360; 348/40; 348/79; 348/375; 348/376
(58) Field of Classification Search ............ 348/79, 348/375, 376, 360
See application file for complete search history.

(56) References Cited

U.S. PATENT DOCUMENTS

| | | | |
|---|---|---|---|
| 4,707,053 A | 11/1987 | Gurevich et al. | |
| 5,192,867 A * | 3/1993 | Osakabe et al. | 250/311 |
| 6,411,406 B1 | 6/2002 | Kreuzer | |
| 6,414,763 B1 | 7/2002 | Hesselink et al. | |
| 6,504,810 B2 | 1/2003 | Itoh et al. | |
| 6,535,276 B2 | 3/2003 | Dubois | |
| 6,574,181 B1 | 6/2003 | Tanaka et al. | |
| 6,809,845 B1 | 10/2004 | Kim et al. | |
| 6,876,474 B2 | 4/2005 | Kreuzer et al. | |
| 7,732,766 B2 * | 6/2010 | Yoshida | 250/311 |
| 7,839,551 B2 * | 11/2010 | Lee et al. | 359/15 |
| 2003/0002424 A1 | 1/2003 | Temple | |
| 2004/0218240 A1 | 11/2004 | Lin et al. | |
| 2009/0318186 A1 * | 12/2009 | Boutant | 455/556.1 |

FOREIGN PATENT DOCUMENTS
WO    WO 2009/059008 A1 *    5/2009

OTHER PUBLICATIONS

R. Hart, "Cell Camera Turned Medical Microscope," www.abclocal.go.com, Mar. 17, 2008.
D. Gabor, "A New Microscopic Principle," Nature 161, pp. 777-778 (1948), ISSN 0028-0836.

(Continued)

*Primary Examiner* — Ngoc-Yen Vu
(74) *Attorney, Agent, or Firm* — Hoffmann & Baron, LLP

(57) ABSTRACT

The preferred embodiments of the present invention include a holography attachment device that is attachable to a digital imaging device to form a holographic microscope. The holography attachment device includes a chamber having at least one attachment mechanism to facilitate attachment of the chamber to a digital imaging device. The holography attachment device also includes a light source and a sample holder section, which is located between a proximate end and the distal end of the chamber. The light source is configured to radiate light within the chamber. The light passes through the sample holder section and impinges on an imaging sensor of a digital imaging device when the chamber is attached to the digital imaging device. The digital imaging device is capable of recording hologram information related to a sample held by the sample holder in the sample holder section.

21 Claims, 9 Drawing Sheets

OTHER PUBLICATIONS

J. Swoger, M. Martinez-Corral, J. Huisken, and E. H. K. Stelzer, "Optical Scanning Holography as a Technique for High-Resolution Three-Dimensional Biological Microscopy," J. Opt. Soc. Am. A-Opt. Image Sci. Vis. 19, pp. 1910-1918 (2002), ISSN 0740-3232.

J. Sheng, E. Malkiel, J. Katz, J. Adolf, R. Belas, and A. R. Place, "Digital Holographic Microscopy Reveals Prey-Induced Changes in Swimming Behavior of Predatory Dinoflagellates," Proceedings of the National Academy of Sciences 104, pp. 17512-17517 (2007).

W. B. Xu, M. H. Jericho, I. A. Meinertzhagen, and H. J. Kreuzer, "Digital In-Line Holography for Biological Applications," Proc. Natl. Acad. Sci. U.S.A. 98, pp. 11301-11305 (2001), ISSN 0027-8424.

S. K. Jericho, J. Garcia-Sucerquia, W. B. Xu, M. H. Jericho, and H. J. Kreuzer, "Submersible Digital In-Line Holographic Microscope," Rev. Sci. Instrum. 77, (2006), ISSN 0034-6748.

P. Marquet, B. Rappaz, P. J. Magistretti, E. Cuche, Y. Emery, T. Colomb, and C. Depeursinge, "Digital Holographic Microscopy: A Noninvasive Contrast Imaging Technique Allowing Quantitative Visualization of Living Cells with Subwavelength Axial Accuracy," Opt. Lett. 30, pp. 468-470 (2005), ISSN 0146-9592.

J. Garcia-Sucerquia, W. B. Xu, S. K. Jericho, P. Klages, M. H. Jericho, and H. J. Kreuzer, "Digital In-Line Holographic Microscopy," Appl. Optics 45, pp. 836-850 (2006), ISSN 0003-6935.

W. Xu, M. H. Jericho, H. J. Kreuzer, and I. A. Meinertzhagen, "Tracking Particles in Four Dimensions with In-Line Holographic Microscopy," Opt. Lett. 28; pp. 164-166 (2003).

* cited by examiner

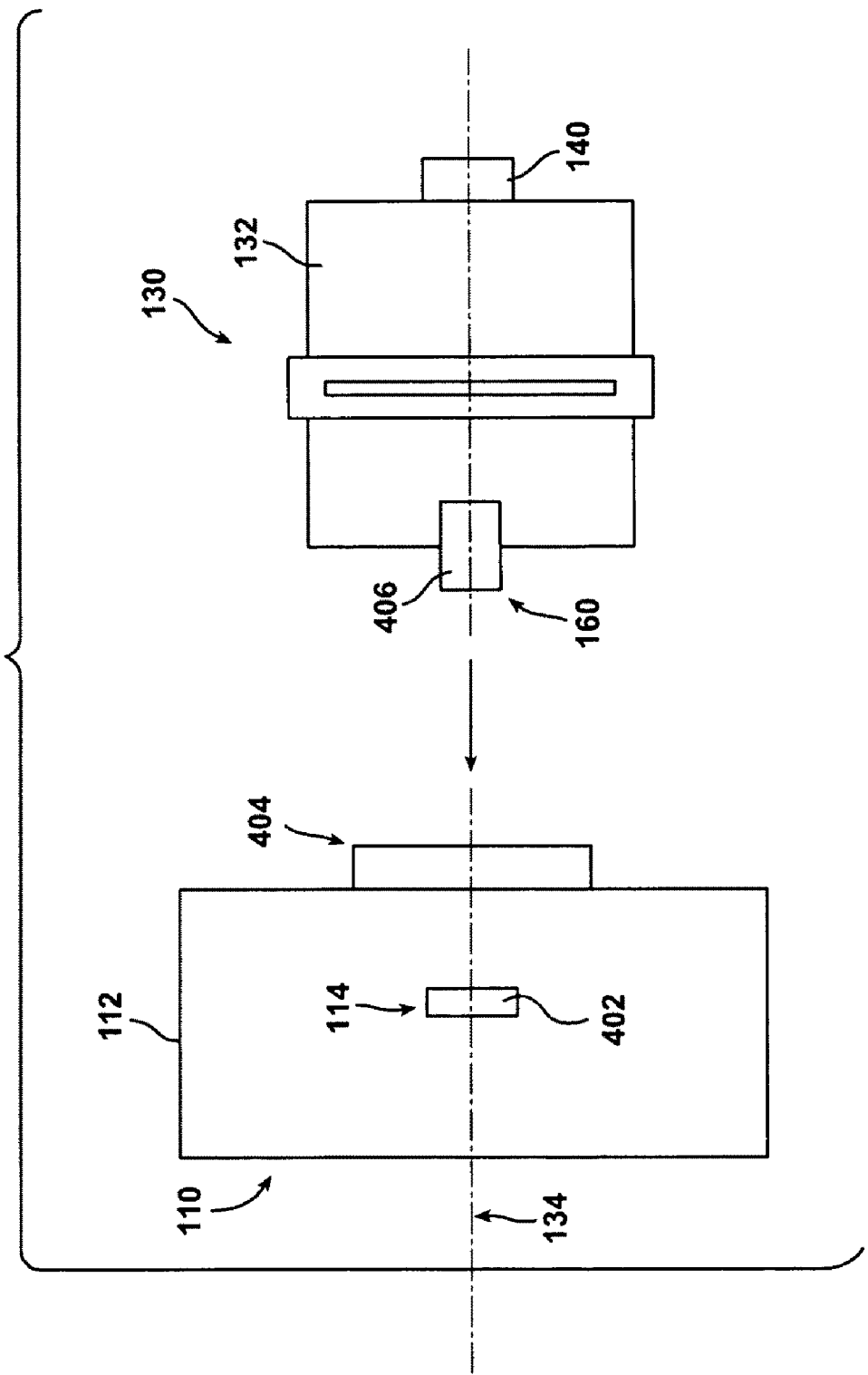

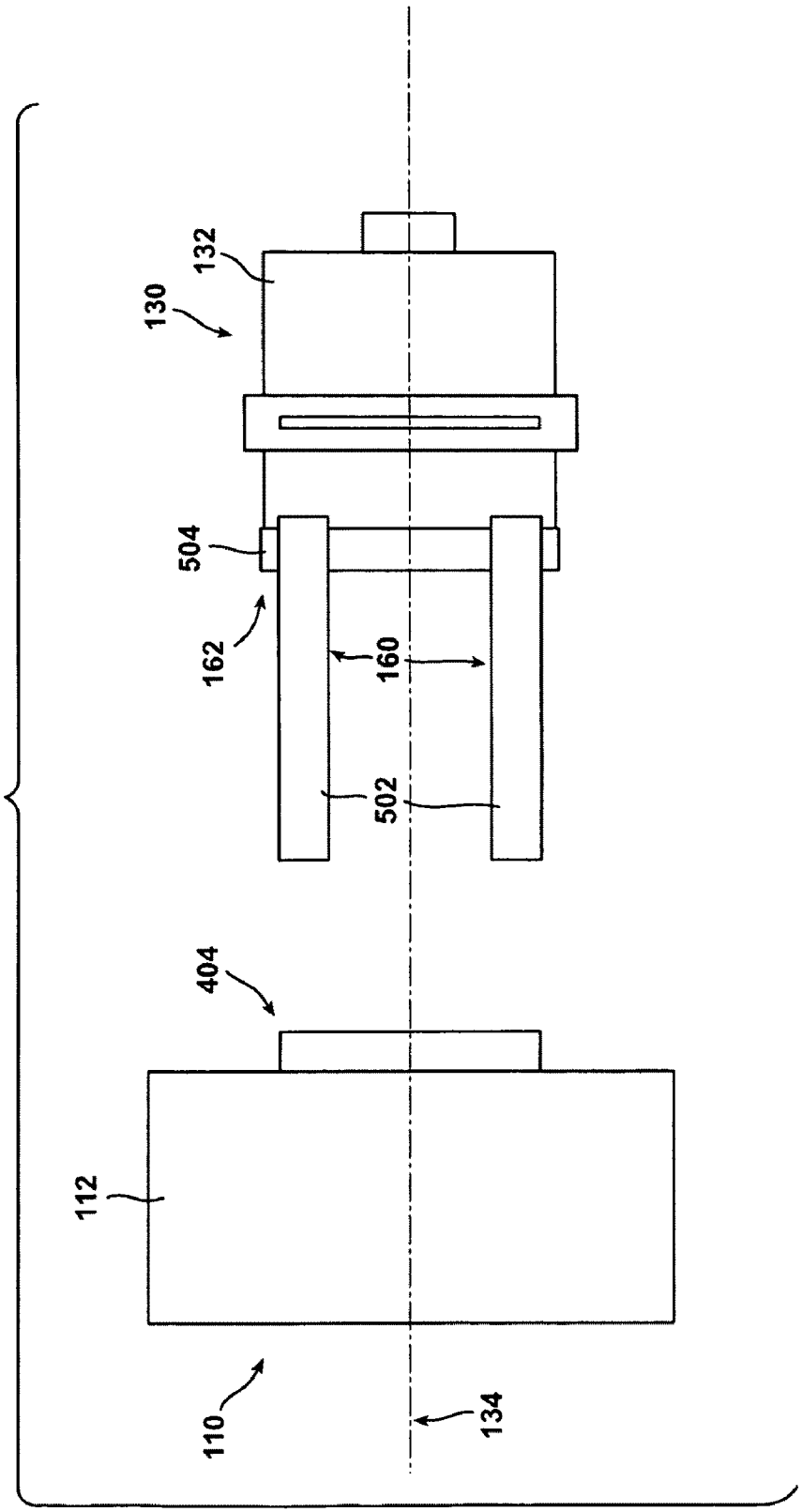

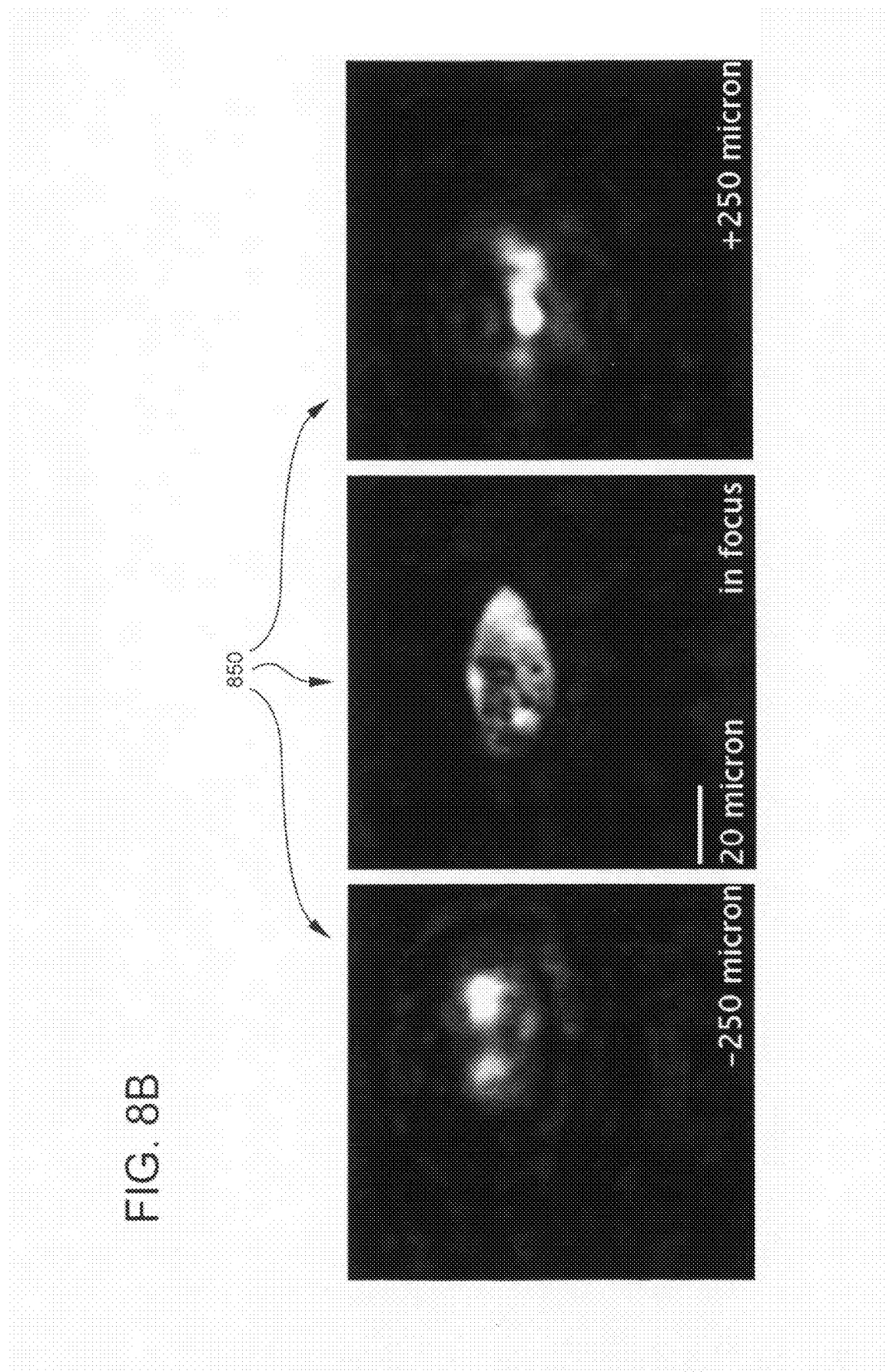

HOLOGRAPHIC MICROSCOPE

BACKGROUND OF THE INVENTION

1. Field of the Invention

The present invention is related to holographic microscopy, and more specifically to a holography attachment device that is attachable to a digital imaging device.

2. Brief Description of Related Art

Holographic microscopy uses holographic imaging to overcome limitations found in other forms of microscopy. Holographic microscopy can be implemented using digital holography techniques to acquire and display three-dimensional (3D) information about a sample.

Digital holography has been brought about by rapid advances in digital image acquisition technology, where imaging sensors, such as charge coupled devices (CCDs) and Complimentary Metal Oxide Semiconductor (CMOS) imaging sensors, can acquire digital images with high optical resolution and sensitivity. Imaging applications that may use digital holography can include biological microscopy, fluid dynamics, particle tracking, and the like.

Holographic imaging is typically implemented as a two-step process. In the first step, two-dimensional (2D) image information of one or more objects is collected via an imaging sensor. In the second step, the 2D imaging information must be reconstructed using a reconstruction technique to produce a 3D representation of the sample. The reconstruction technique reconstructs the wavefront at the object using numerical evaluation of the Kirchoff-Helmholtz transform.

In recent years, holographic microscopes that allow users to acquire holographic images have been constructed using imaging components (e.g., imaging sensor and signal processor) and a light source spaced at a distance from, and configured to radiate light towards, the imaging sensor. These units are generally expensive and can be burdensome to transport and use in field applications. Further, these units can only be used for a single application (i.e. holographic microscopy). As a result, a holography attachment device that is attachable to and compatible with stand alone digital imaging devices is desired.

SUMMARY OF THE INVENTION

The preferred embodiments of the present invention include a holography attachment device that can be attached to a digital imaging device. The digital imaging device can have a body and an imaging sensor disposed therein to convert light into an electric charge. The holography attachment device is configured to attach to the digital imaging device, hold a sample, and radiate light through the sample. The light radiating through the sample can impinge on the imaging sensor when the holography attachment device is attached to the camera body and the imaging sensor can record a two-dimensional hologram associated with the sample.

In some embodiments, the digital imaging device can convert the two-dimensional hologram data to three-dimensional image data using a reconstruction technique and can display the three-dimensional image. In other embodiments, a computing device can be configured to receive the two-dimensional hologram data from the digital imaging device and to convert the two-dimensional hologram data to a three-dimensional image using a reconstruction technique.

In the preferred embodiments, the holography attachment device includes a chamber and preferably a light source. The chamber of the holography attachment device has a proximate end configured to attach to a digital imaging device, a distal end having a wall, and a sample holder section located between the proximate end and the distal end. The chamber can be configured to attach to digital imaging device, such as a single lens reflex (SLR) digital camera, a digital point-and-shoot camera, or a cell phone-based digital camera. In some embodiments, the chamber can be attachable to the digital imaging device in place of a detachable lens and can be configured to attach to an SLR camera interface. The chamber can substantially prevent light external to the chamber from entering an internal cavity of the chamber.

The light source is configured to radiate light within the chamber. The light source can include a light emitting device, such as a laser diode or light emitting diode for generating coherent or incoherent light, a single mode fiber, and a light manipulating device, such as a lens, aperture, collimator, or beam expander. The single mode fiber has a proximate end and a distal end, the proximate end being coupled to the light emitting device. The light manipulating device can be located in the path of the light to manipulate the light by, for example, focusing the light. The single mode fiber can guide light radiating from the laser diode to the light manipulating device, through which light exiting the single mode fiber passes. The light radiated in the chamber passes through the sample holder section and is incident on an imaging sensor of the digital imaging device when the chamber is attached to the digital imaging device. In some embodiments, the light source can be disposed on the distal end of the chamber so that the light source is inline with the imaging sensor when the chamber is attached to the digital imaging device.

The sample holder section is configured to receive a sample. For example, the sample holder section can receive at least one of a microscope slide and a cuvette, both of which can hold a sample. In some embodiments, at least one of the light source and the sample holder section can be adjusted with respect to the other to increase or decrease the distance between the light source and the sample holder section.

In one embodiment hologram data associated with a sample can be observed by attaching a holography attachment device to an off-the-shelf digital camera, inserting a sample in the holography attachment device, radiating light through the sample, and recording a two-dimensional hologram associated with the sample from the light impinging upon the image sensor. In some embodiments, the holography attachment device can be attached to the off-the-shelf digital camera by securing the holography attachment device to the off-the-shelf digital camera in place of the camera lens. In other embodiments, the holography attachment device can be attached to the off-the-shelf digital camera by securing the holography attachment device over a lens of the off-the-shelf-digital camera. A three-dimensional image can be constructed from the two-dimensional hologram data, which can then be rendered on a display.

The preferred embodiments of the holography attachment device, as well as other objects, features and advantages of the present invention will be apparent from the following detailed description, which is to be read in conjunction with the accompanying drawings wherein like reference numerals in the various figures are utilized to designate like components. The scope of the invention will be pointed out in the claims.

BRIEF DESCRIPTION OF THE DRAWINGS

FIG. 4 is a side view of another embodiment of a holography attachment device detached from a digital imaging device;

FIG. 5 is a side view of a holography attachment device suitable for use with a point-and-shoot digital camera;

FIG. 8B depicts the same region reconstructed in several sample planes.

DETAILED DESCRIPTION OF THE PREFERRED EMBODIMENTS

The preferred embodiments of the present invention are directed to a holography attachment device that is attachable to a digital imaging device, such as a single lens reflex (SLR) digital camera, a point-and-shoot digital camera, a cell phone based camera, and the like. The holography attachment device can include an attachment mechanism for securing the holography attachment device to the digital imaging device. In some embodiments, the attachment mechanism of the holography attachment device interfaces with an attachment mechanism on the digital imaging device. The holography attachment device, when attached to the digital imaging device, allows the digital imaging device to record two-dimensional (2D) hologram information associated with an object, held by the holography attachment device, via an imaging sensor within the digital imaging device. The 2D hologram can subsequently be used to construct three-dimensional (3D) images. The preferred embodiments of the present invention can have a lateral resolution of about 2 micrometers or better.

As used herein, "digital imaging device" broadly refers to a device that is manufactured to capture light and generate digital images, and includes all commercially or otherwise available off-the-shelf digital cameras or digital imaging modalities, such as SLR digital cameras, point-and-shoot digital cameras, cell phone-based digital cameras, webcams (internal or external to a computing device), digital cameras intrinsic to personal music devices, cameras based in hand held computers (e.g., personal digital assistants (PDAs)), and the like.

Figure 1A:
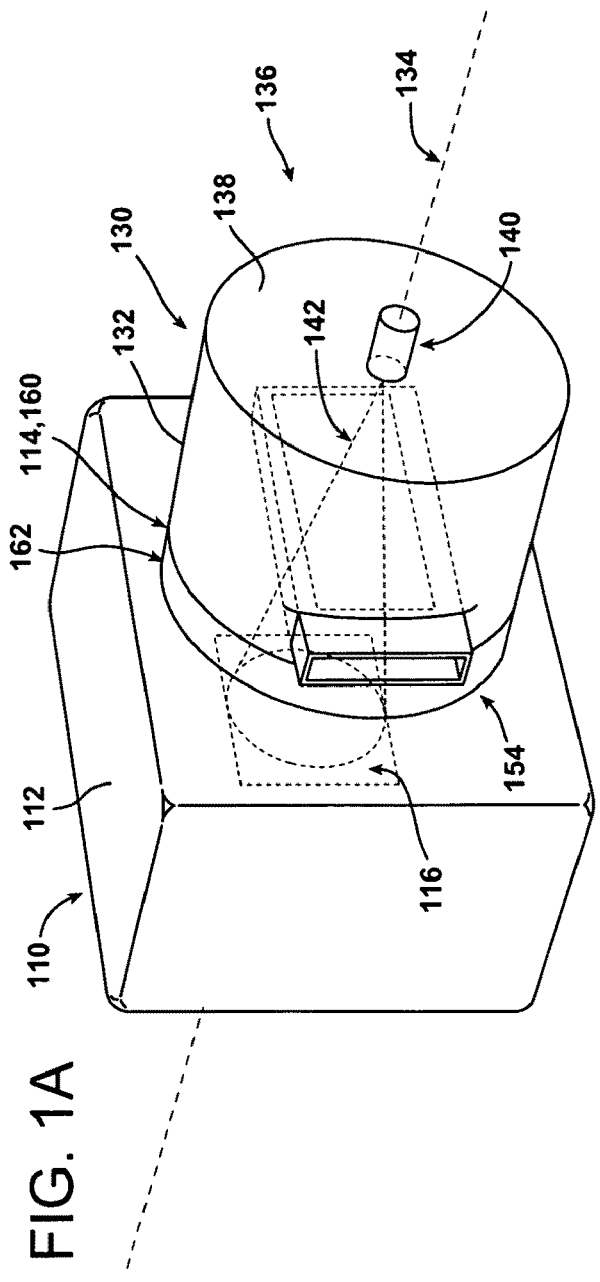
FIG. 1A is a perspective view of a holography attachment device attached to a digital imaging device in accordance with a preferred embodiment of the present invention.
Figure 1C:
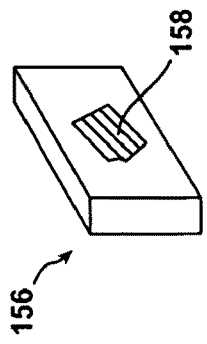
FIG. 1C depicts an exemplary sample holder that can be used with the holography attachment device of FIG. 1A.
Figure 1B:
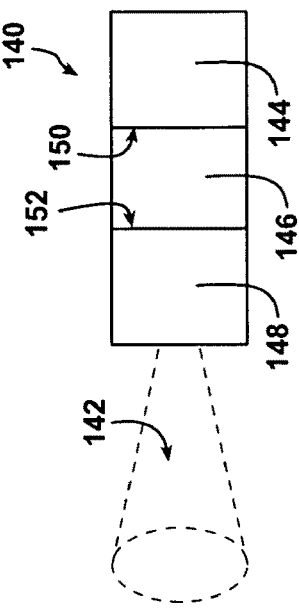
FIG. 1B depicts a preferred embodiment of a light source of the holography attachment device of FIG. 1A in more detail.
Figure 2:
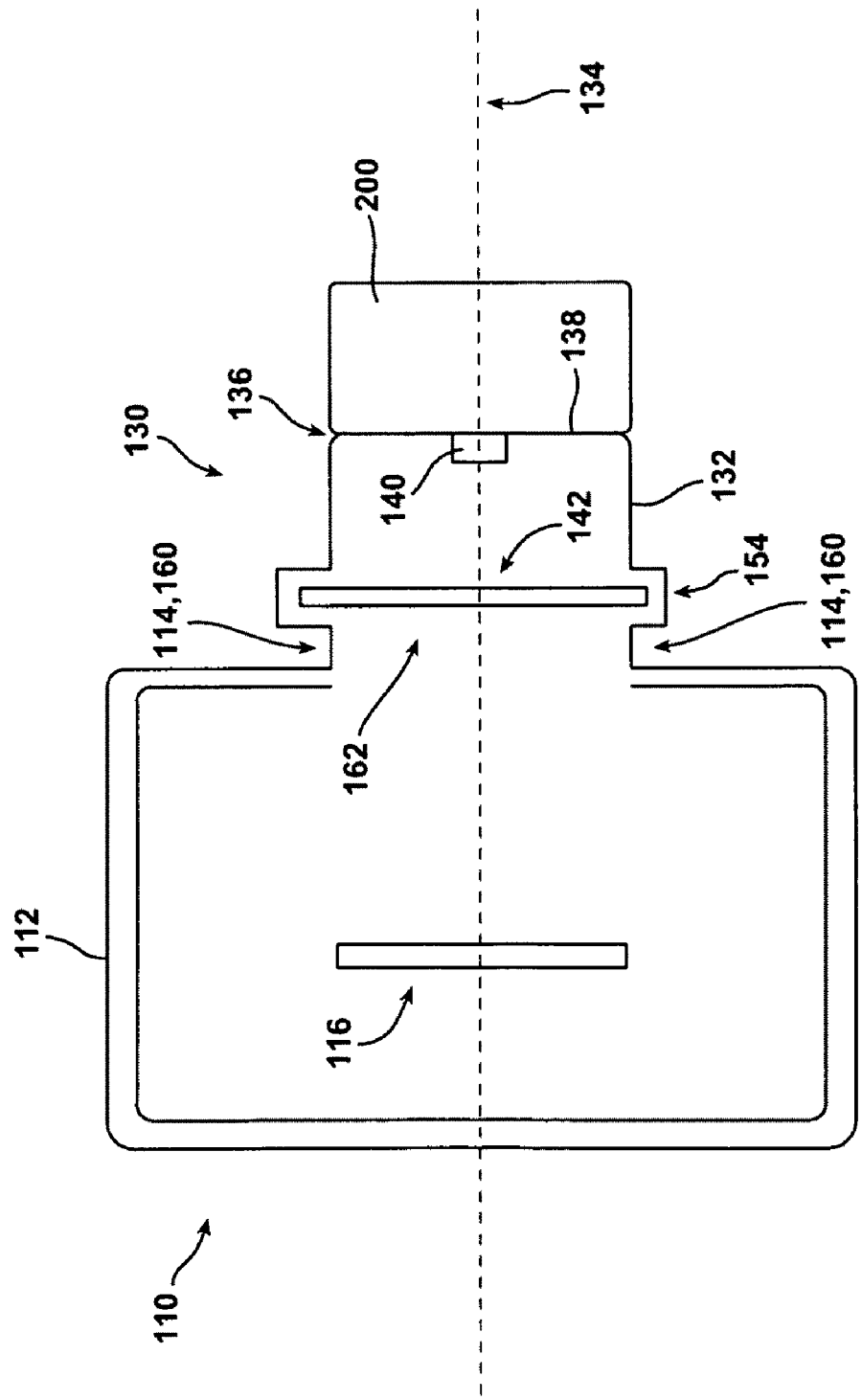
FIG. 2 is a side view of a holography attachment device having a power source attached to a digital imaging device.

FIG. 1A depicts a perspective view of a holography attachment device 110 attached to a digital imaging device 110 (hereinafter "device 110"), the implementation of which being generally known to those skilled in the art. FIG. 2 depicts a side view of the device 110 with a power unit 200 disposed thereon. In the present embodiment (FIGS. 1 and 2), the device 110 is a SLR digital camera that includes a camera body 112 with an attachment mechanism 114 that facilitates interfacing the device 110 with the holography attachment device 130. The attachment mechanism 114 can be a lens mount of the device 110 that can be implemented using an interface known to those skilled in the art, such as a screw-in type, a bayonet type, or a frictionless lock type for securing various SLR lens and/or the holography attachment device 130 thereto. The device 110 can include an imaging sensor 116, such as a charge coupled device (CCD) sensor or a Complimentary Metal Oxide Semiconductor (CMOS) imaging sensor, for receiving and converting light into electric charge. The device 110 can also include other electronic components known to those skilled in the art for processing the electric charge, such as an analog-to-digital converter (ADC), a digital signal processor (DSP), storage, and the like. While the present embodiment shows the device 110 as a SLR digital camera, those skilled in the art will recognize that other types of digital imaging devices, such as a point-and-shoot digital camera, a cell phone camera, or other commercially available off-the-shelf digital imaging modality can be interfaced with the holography attachment device in accordance with the preferred embodiments of the present invention.

The holography attachment device 130 preferably includes a chamber 132, a light source 140, a sample holder section 154, and an attachment mechanism 160. The chamber 132 preferably has a cylindrical configuration that has a substantially continuous longitudinal cylindrical surface about a center axis 134. A distal end 136 of the chamber 132 has a wall 138. The configuration of the holography attachment device 130 is preferably formed such that the holography attachment device 130 substantially prevents light of the surrounding environment from entering the internal cavity of the chamber 132 when the chamber 132 is attached to the device 110. As an alternative, the attachment need not be cylindrical nor have a substantial longitudinal cylindrical surface if, for example, the sample is inserted into the camera or imaging device body.

The light source 140 (FIGS. 1A and 1B) can be disposed with respect to the wall 138 so that the light source 140 radiates light 142 through the internal cavity of the holography attachment device 130 preferably along the center axis 134. The light source 140 can be configured to generate coherent or incoherent light and preferably includes a light emitting device 144, such as a laser diode, a light emitting diode (LED), or the like. As used herein, "coherent" light refers to in phase, single wavelength light radiation, such as light that is generated by a laser. For embodiments that are configured to generate incoherent light, the incoherent light can be incoherent monochromatic light radiation, such as light that is generated by an LED, which is typically spatially and spectrally less coherent than laser radiation. In some embodiments, multiple light emitting devices operating at different wavelengths can be used for improved axial resolution of phase imaging.

The light source 140 also preferably includes a single mode fiber 146, and a light manipulation device 148, such as Gradient Index (GRIN) or other converging/diverging lenses, a pinhole aperture, collimator, beam expander, and the like. In a preferred embodiment, the light manipulation device 148 is a GRIN lens or pinhole aperture used to focus the light radiating from the light emitting device 144 to a point from which the light radiates in a fashion approximated by a spherical wave. In an alternative embodiment, the light manipulating device 148 can be configured to produce other wavefronts, such as that of a plane wave produced by a beam expander. In some embodiments, the light source 140 can be implemented using the light emitting device 144 without the single mode fiber 146 and/or the GRIN lens 148 and a diverging lens or no lens may be used.

The light emitting device 144 is preferably coupled to the single mode fiber 146 at a proximate end 150 so that light from the light emitting device 144 is guided by the single mode fiber 146. The light manipulating device 148, such as a GRIN lens, is located at a distal end 152 of the single mode fiber 146 such that light 142 passes through the light manipulating device 148 and towards the image sensor 116. In one embodiment, the light manipulating device 148 is a GRIN lens that is configured with a radially decreasing gradual refractive index variation so that light passing through the GRIN lens converges upon a focal point close to the distal end of the lens. The resulting wavefront is closely approximated as a spherical wavefront from the GRIN lens' focal point which illuminates the object and sensor.

Still referring to FIGS. 1A and 2, the sample holder section 154 can be formed in the lateral surface of the chamber 132 and can extend inwardly and across the internal cavity of the chamber 132 in a direction that is substantially orthogonal to the center axis 134. The sample holder section 154 allows objects to be placed between the light source 140 and the imaging sensor 116 so that when the holography attachment device 130 is attached to the device 110 and operating, the light 142 from the light source 140 preferably passes through and around the object so that the light impinges upon the imaging sensor 116, which records 2D hologram information related to the object. In some embodiments, the light source 140, the sample, and the imaging sensor 116 are place inline with each other so that the object and reference wave traversing the same path. In these embodiments, the sample and the sample holder typically have a low optical density so that light incident on the sample and the sample holder is not excessively scattered. In other embodiments, the object wave and the reference wave may not traverse the same path.

The distance between the light source 140 and the sample holder section 154 can be a predetermined distance, or in some embodiments, the location of the sample holder section 154 or the light source 140 can be adjusted so that the sample holder section 154 or light source 140 can be moved closer and/or further away from each other. Likewise, the distance between the sample holder section 154 and the imaging sensor 116 can be a predetermined distance or can be adjustable. In a preferred embodiment, a sample holder 156, such as a microscope slide or a cuvette, can be used to hold a sample 158 (e.g. an object) (FIG. 1C). The sample holder 156 can be inserted into the sample holder section so that the sample can be positioned in the path of the light 142.

The attachment mechanism 160 of the holography attachment device 130 is located at a proximate end 162 of the holography attachment device 130 and is configured to interface with the attachment mechanism 114 of the device 110 so that the holography attachment device 130 can be secured to the device 110. The preferred embodiments of the attachment mechanism 160 are discussed in more detail below.

In some embodiments, the holography attachment device 130 can include a power source 200 disposed at the distal end 136 (FIG. 2). The power source 200 can be a battery (rechargeable or disposable) that can be used to power the light source 140. For embodiments that do not include the power source 200, the light source can be powered by the power source of the device 110. The overall power requirements of the holography attachment device are minimal and might be supplied by a solar cell or manual generator.

Figure 3:
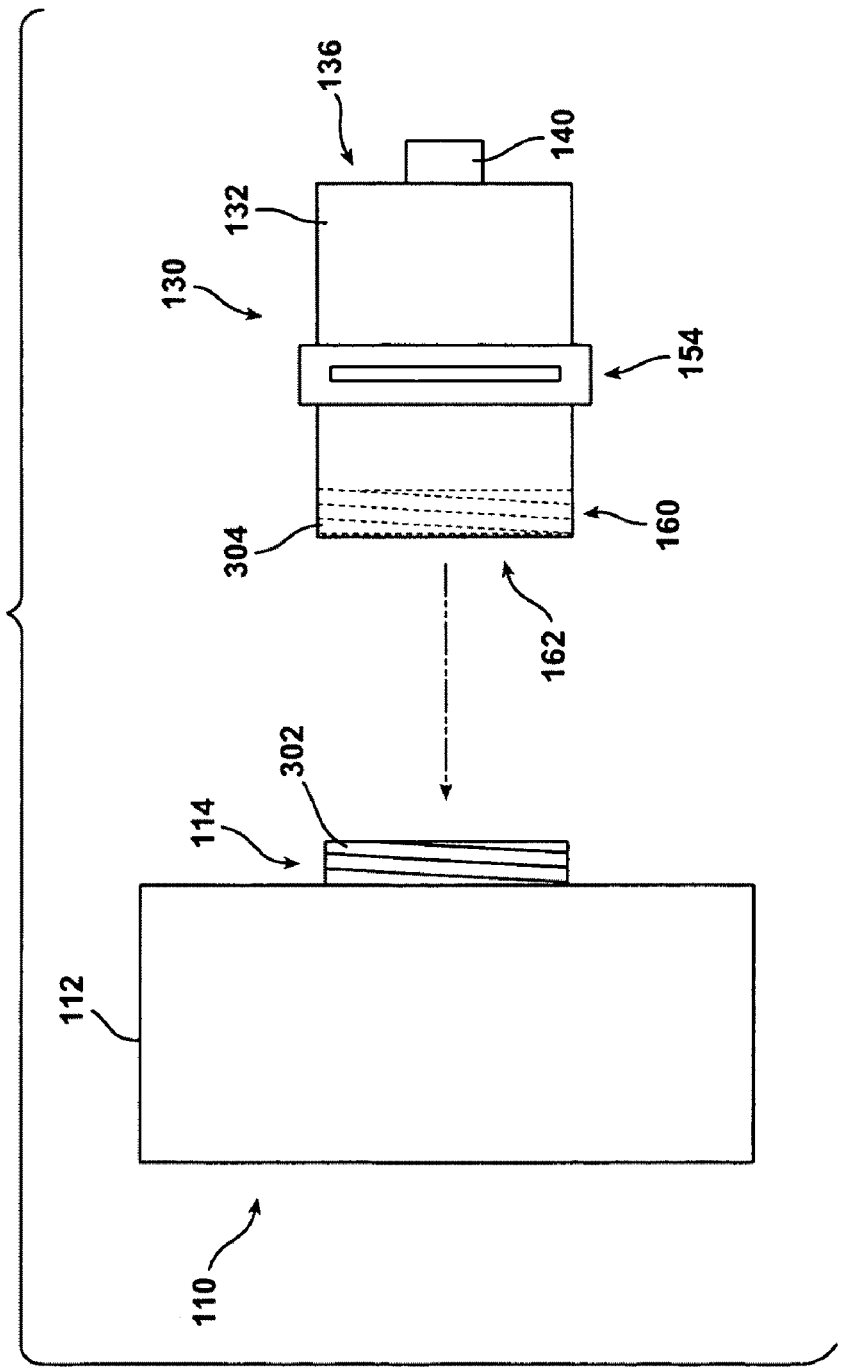
FIG. 3 is a side view of a holography attachment device detached from a digital imaging device.

FIG. 3 depicts one embodiment of the attachment mechanisms 114 and 160. In the present embodiment, the attachment mechanisms 114 and 160 have corresponding threaded sections 302 and 304, respectively. To secure the holography attachment device 130 to the device 110, the holography attachment device 130 can be attached to the device 110 using the threaded sections 302 and 304 such that the attachment mechanisms 114 and 160 threadingly engage each other. The attachment mechanisms 114 and 160 allow for interchangeability of attachment devices. For example, a user can have multiple camera lenses and holography attachment devices suitable for connecting to the device 110. The user can easily remove the lens and replace it with the holography attachment device 110 so that the digital camera is converted into a holographic microscope that captures 2D hologram information, which can be processed to generate 3D images. Thus, the user can have a single digital imaging device that can be used for multiple applications. As a result, the user can transform a conventional digital camera into a holographic microscope simply by using the holography attachment device 130 disclosed herein. As a result, the cost of holographic microscopy can be reduced and the amount of equipment required to perform multiple imaging applications can be reduced. In addition, the preferred embodiments of the present invention provide a low cost route to high resolution microscopy which is easily transported and applicable under conditions where a conventional light microscope is impractical or impossible.

FIG. 4 depicts another embodiment for implementing corresponding attachment mechanisms 114 and 160. In the present embodiment, the attachment mechanism 114 of the device 110 can include recessed portions 402 on the sides of the device 110 for receiving a portion of the attachment mechanism 160 of the holography attachment device 130. The device 110 can have a body 112 that houses the electronic components of the device 110, which can include those components typically found in a digital camera, such as an imaging sensor, ADC, DSP, storage, and the like. In addition, the device 110 can include a lens 404. The lens 404 may be a fixed focal point lens, a telescoping lens, compact folded optical zoom lens that is typically positioned vertically within the body and that uses a prism that folds the optical path, or any suitable lens technology. The holography attachment device 130 can fit over the lens area.

The attachment mechanism 160 can include extended clamping sections 406 that engage the recessed portions 402 of the device 110 and can lockingly secure the holography attachment device 130 to the device 110. The clamping sections 406 can include a spring mechanism that forces the clamping sections 406 inward towards the center axis 134 of the holography attachment device 130 such that the holography attachment device 130 is secured to the device 110 by the force imposed by the spring mechanism.

FIG. 5 depicts another embodiment of an attachment mechanism 160. In the present embodiment, the device 110 represents a digital point-and-shoot digital camera, which can be a cell phone-based digital camera, the implementation of which is known to those skilled in the art. The device 110 can have a body 112 that houses the electronic components of the device 110, as discussed above. In addition, the device 110 can include the lens 404. The holography attachment device 130 can fit over the lens area. The attachment mechanism 160 can be implemented as straps 502 that can be fastened around the body 112 of the device. The straps 502 can be tightened around the body 112 to securely attach the holography attachment device 130 to the device 110. In some embodiments, the straps can include Velcro®, buckles, tension fasteners, and the like.

The holography attachment device 130 can also include a resilient member 504 at the proximate end 162 of the chamber 132 of the holography attachment device 130. The resilient member 504 preferably conforms to the perimeter or circumference of the chamber 132 at the proximate end 162. The resilient member 504 can be formed from a resilient polymer, such as rubber. When the holography attachment device 130 is attached to the device 110, the resilient member 504 can be compressed against the body 112 of the device 110 as the attachment mechanism tightens around the device 110 to ensure that the holography attachment device 130 is firmly secured to the device 110. The resilient member 504 can also prevent the device 110 and the holography attachment device 130 from being damaged when the holography attachment device 130 is attached to the device 110.

Figure 6B:
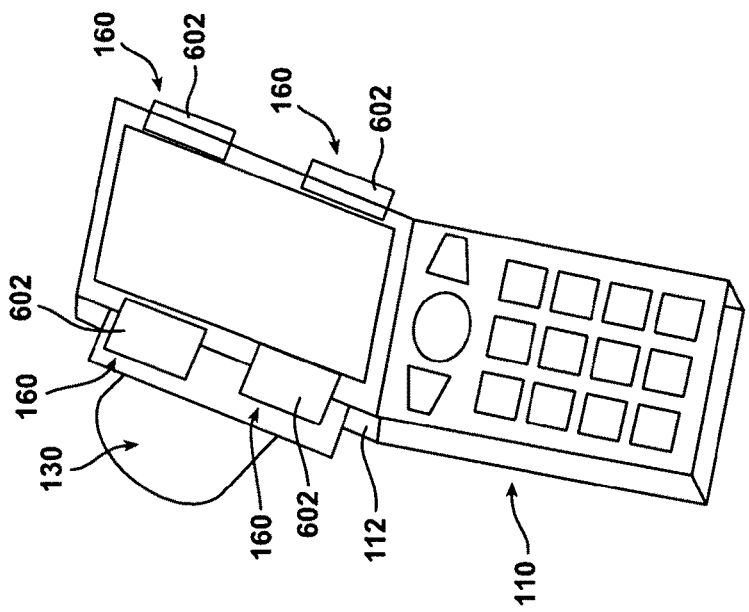
FIG. 6B is a perspective view of the holography attachment device of FIG. 6A attached to a cell-phone having an embedded digital camera.
Figure 6A:
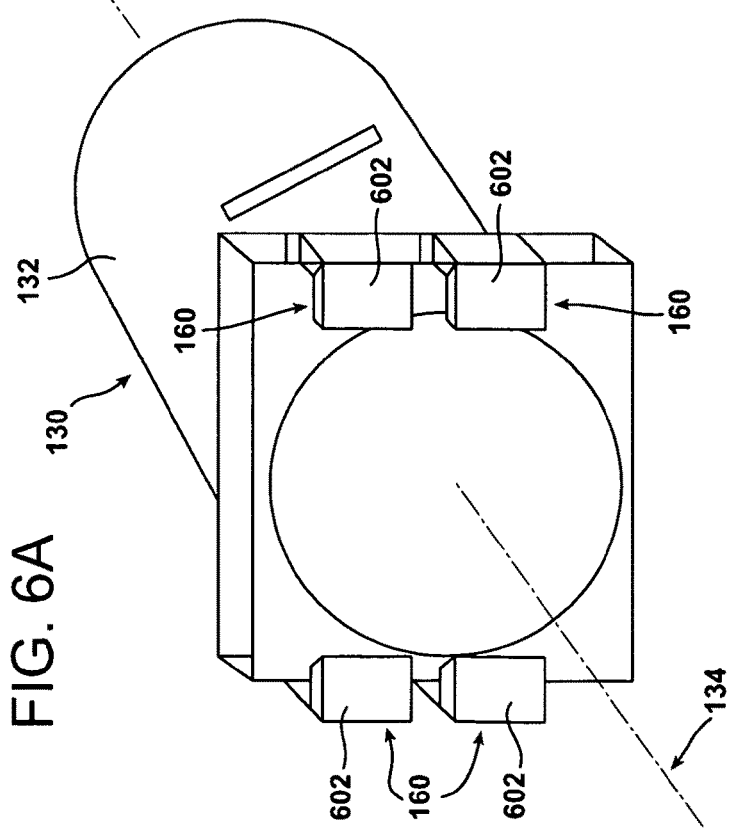
FIG. 6A is a perspective view of a holography attachment device suitable for use with a cell phone-based camera.

FIG. 6A is a perspective view of another embodiment of a holography attachment device suitable for use with a cell phone-based digital camera and FIG. 6B is a perspective view of the holography attachment device attached to the cell phone-based digital camera. In the present embodiment, the device 110 is a cell phone-based digital camera, the implementation of which is known to those skilled in the art. The device 110 can have a body 112 that houses the electronic components of the device 110, as discussed above. In addition, the device 110 can include the lens, which is embedded in the body 112 so that there is a lens area on the body 112 through which light can pass. The holography attachment device 130 can fit over the lens area. The attachment mechanism 160 can be implemented as, for example, clamping mechanisms 602 that can be clamped to the body 112 of the device. The clamping mechanism can include a spring mechanism that forces the clamping mechanisms 602 inward towards the center axis 134 of the holography attachment device 130 so that the holography attachment device 130 can be lockingly secured to the device 110 by the force imposed by the spring mechanism.

Figure 7:
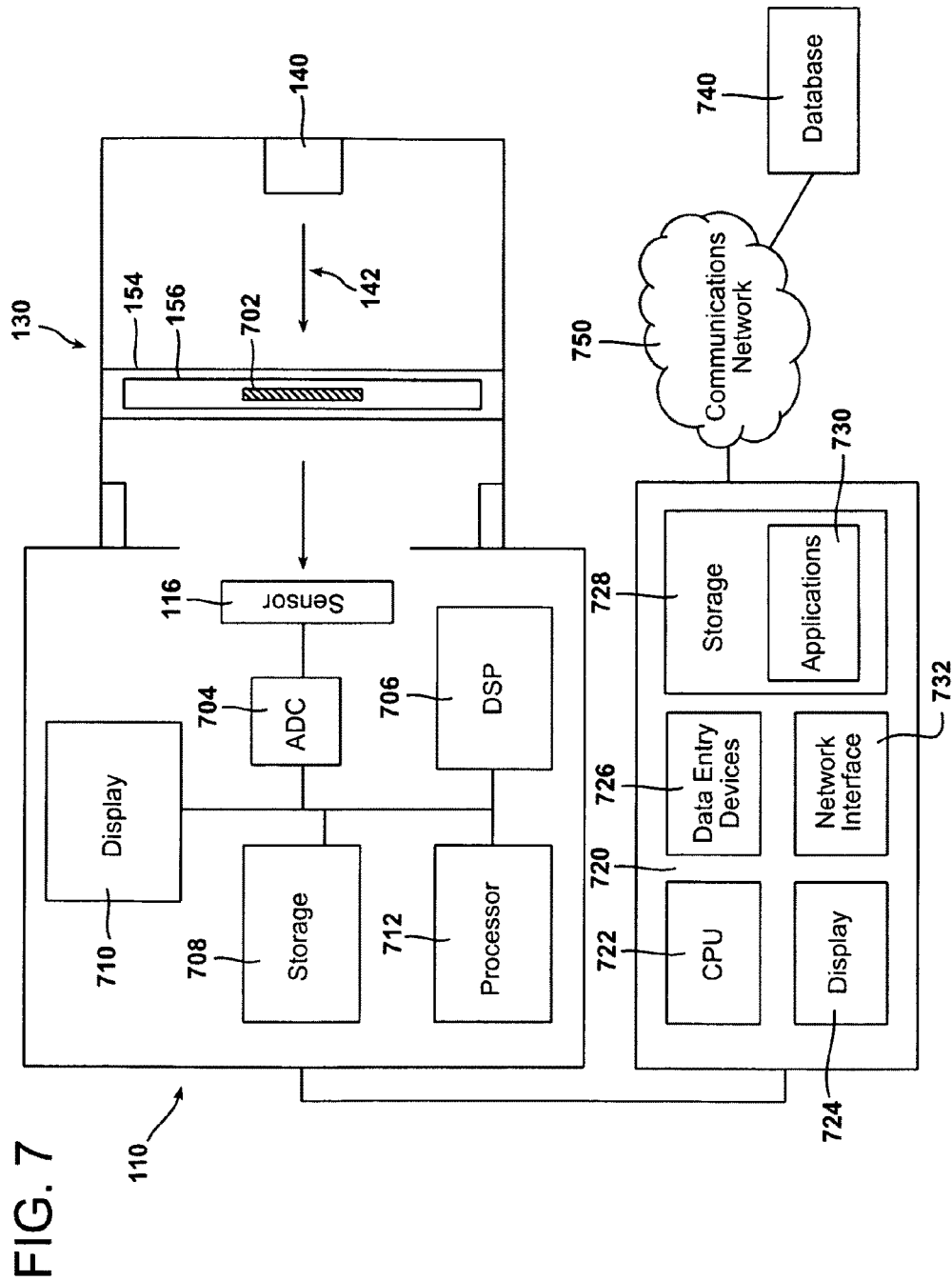
FIG. 7 is a block diagram illustrating the operation of the holography attachment device and digital imaging device when the holography attachment device is attached to the digital imaging device.

FIG. 7 depicts a block diagram that illustrates the preferred operation of the holography attachment device 130 and the device 110 when they are attached. A sample 702, such as liquid containing microorganisms, can be placed on or in the sample holder 156, which can be a microscope slide or a cuvette and can be positioned within the sample holder section 154. The light source 140 can be turned so that light 142 radiates from the light source 140 towards the image sensor 116. The sample 702 is positioned in the path of the light 142 so that the light 142 passes through and around the sample 702 before impinging upon the image sensor 116. For embodiments that include a lens, the light 142 passes through the lens before impinging upon the image sensor 116.

The light 142 captured by the image sensor 116 is converted into electric charge by a matrix of pixels on the image sensor 116. The electrical charge is digitized by the ADC 704 to create a digital signal that corresponds to the light 142 that impinges upon the image sensor 116. The ADC 704 passes the digital signal to the DSP 706 for signal processing. The DSP 706 can apply digital processing techniques known to those skilled in the art. After the digital signal is processed it can be stored in storage 708. The display 710 can be a liquid crystal display (LCD) or other technologies commonly used by digital imaging devices to display images. The display 710 can be used to allow the user to contemporaneously view information pertaining to exposure of the image sensor 116 to the light 142. In addition, the display 710 can be used to view information stored in storage 708.

The light 142 captured by the image sensor 116 represents a 2D hologram that corresponds to the sample 702 through, and around, which the light 142 passes. To generate a 3D image of the sample 702, a reconstruction process on the 2D hologram is implemented. In a preferred embodiment, numerical reconstruction techniques known to those skilled in the art can be employed.

In one embodiment, the device 110 can perform the reconstruction process using the DSP 706 and/or a processor 712. To achieve this, the device 110 can be loaded with software (or firmware) that can be stored in storage 708, DSP 706, and/or the processor 712. The DSP 706 and/or the processor 712 can generate a 3D image using the digitized signal from the ADC 704 such that the 3D reconstructed images can be generated at the time the image is captured or the DSP 706 and/or the processor 712 can generate the 3D image using a 2D hologram stored in storage 708. For embodiments where the device 110 can generate the 3D image, the 3D image can be rendered on the display 710.

In another embodiment, the device 110 can be connected to a computing device 720 that can generate a 3D image using a 2D hologram provided by the device 110. The computing device 720 can be a mainframe, personal computer (PC), laptop computer, workstation, handheld device, such as a PDA, or the like. In the present embodiment, the computing device 720 includes a central processing unit (CPU) 722 and preferably a display device 724. The display device 724 enables the computing device 720 to communicate directly with a user through a visual display. The computing device 720 can further include data entry device(s) 726, such as a keyboard, touch screen, and/or mouse.

The computing device 720 can include storage 728 for storing data, such as trace information, and instructions, such as instruction for executing traces and graphical depictions of network configurations. The storage 728 can include such technologies as a floppy drive, hard drive, tape drive, Flash drive, optical drive, read only memory (ROM), random access memory (RAM), and the like.

Applications 730, such as applications for reconstructing a 3D image from a 2D hologram, can be resident in the storage 728. The storage 728 can be local or remote to the computing device 720 and can include a database 740, to which the computing device 720 can connect via a communications network 750. The computing device 720 includes a network interface 732 for communicating over the network 750 to retrieve or store information in the database 740. The CPU 722 operates to run the applications 730 in storage 728 by performing instructions therein and storing data, such as 3D reconstructed images, resulting from the performed instructions, which may be depicted via the display 724 or by other mechanisms known to those skilled in the art, such as a print out from a printer.

Figure 8A:
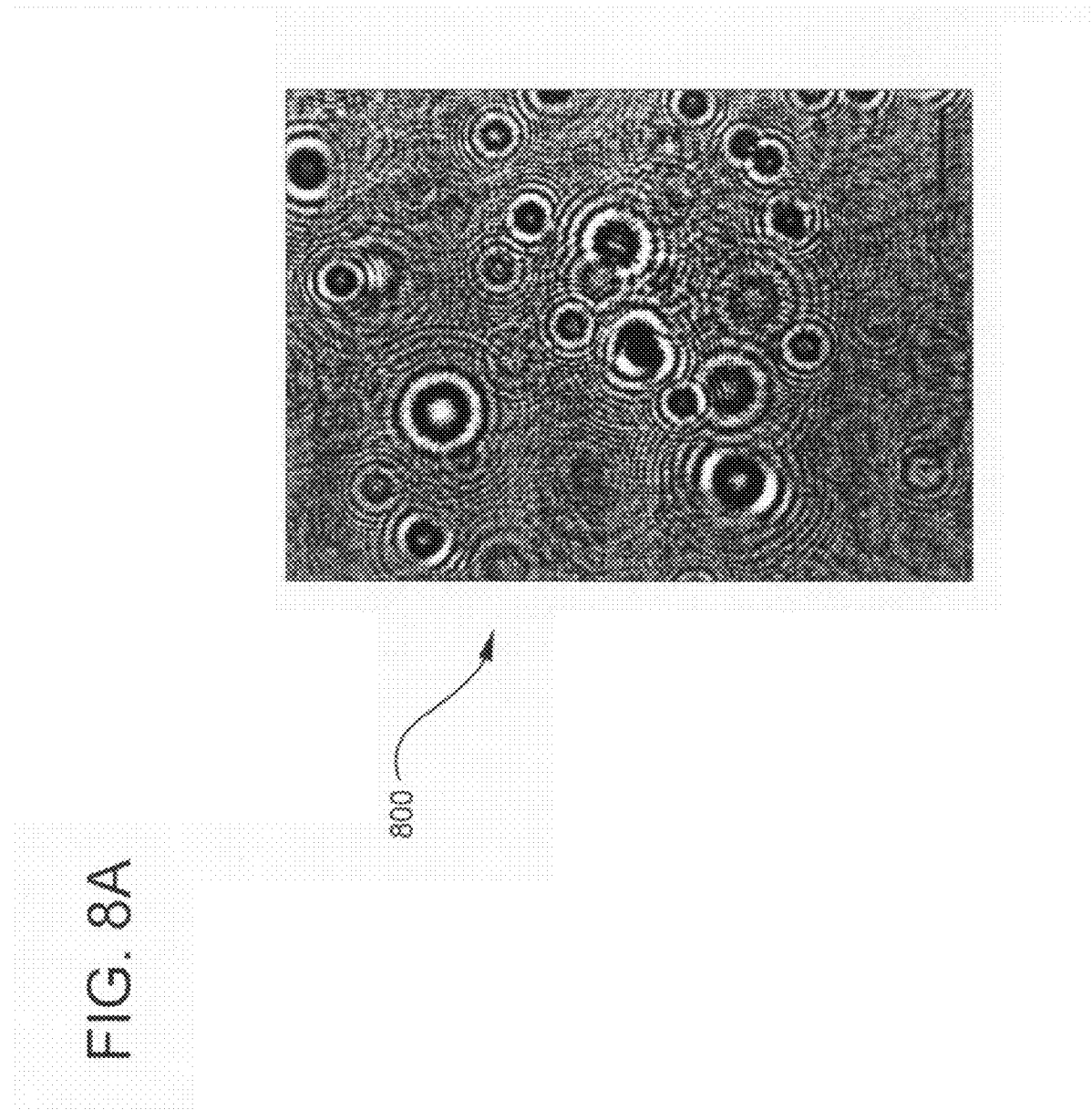
FIG. 8A depicts an illustrative hologram of a region acquired by a preferred embodiment of the present invention.

FIGS. 8A-B are exemplary 3D images 800 that can be produced using the holography attachment device 130 in combination with the digital imaging device. FIG. 8A shows a hologram and FIG. 8B shows several sample planes 850 representing several image distances from the image sensor. In this example, the distance between the image sensor, the light source, and the sample holder section remains fixed, while the reconstruction is performed to form images at various object planes, such as numerical reconstruction using the Kirchoff-Helmholtz transform, which can be calculated via Fresnel, Fraunhofer approximations or a convolution approach. Additional approximations simplifying the Kirchoff-Helmholtz transform are possible depending on the experimental configuration. A sample liquid containing microorganisms is held in a glass cuvette and placed in the sample holder section. In this example, the light source is formed using a laser diode with 635 nanometer wavelength coupled to a single mode fiber, which is coupled to a Gradient Index (GRIN) lens, and the digital imaging device is a commercially available Canon® Digital Rebel XT SLR camera.

While the preferred embodiments illustrate using in-line holography (i.e. aligning the light source, sample, and image sensor along the same axis), those skilled in the art will recognize that other configurations can be implemented, such as off-axis holography. In off-axis holography, reference and sample waves can traverse separate paths towards the image sensor. In this embodiment the geometry of the light source, object and image sensor may be altered. Still, the light passes through and around the object and is incident on the sensor.

The preferred embodiments advantageously allow users to capture holograms of samples using an off-the-shelf, standalone digital imaging device. Thus, a user can convert a digital imaging device into a holographic microscope so that the digital imaging device can be used for multiple applications (e.g., photography and holographic microscopy), which provides a flexible inexpensive solution. The preferred embodiments reduce the amount of equipment that a user has to transport when the user wishes to perform both photography and holographic microscopy in the field. Further the preferred embodiments of the present invention can provide a lateral resolution of about 2 micrometers or better.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. A holography attachment device for a digital imaging device comprising:
a chamber having a proximate end configured to attach to a digital imaging device, a distal end comprising a wall, and a sample holder section located between the proximate end and the distal end, the sample holder section being configured to receive a sample, the chamber being configured to receive light, the chamber being attachable to the digital imaging device in place of a detachable lens.

2. The holography attachment device of claim 1, further comprising a light source configured to radiate light within the chamber, the light passing through the sample holder section and being incident on an imaging sensor of the digital imaging device when the chamber is attached to the digital imaging device, the digital imaging device being configured to record hologram information associated with the sample in the sample holder section.

3. The holography attachment device of claim 2, wherein the light source generates coherent light.

4. The holography attachment device of claim 2, wherein the light source is disposed on the distal end of the chamber so that the light source is inline with the imaging sensor when the chamber is attached to the digital imaging device.

5. The holography attachment device of claim 2, wherein at least one of the light source and the sample holder section can be adjusted with respect to the other to increase or decrease the distance between the light source and the sample holder section.

6. The holography attachment device of claim 1, wherein the chamber is configured to attach to an SLR camera interface.

7. The holography attachment device of claim 1, wherein the chamber is configured to attach to at least one of a digital point-and-shoot camera or a cell phone-based camera.

8. The holography attachment device of claim 1, wherein the chamber is configured substantially prevent light external to the chamber from entering an internal cavity of the chamber.

9. The holography attachment device of claim 1, wherein the sample holder section is configured to receive at least one of a microscope slide and a cuvette.

10. A holography attachment device for a digital imaging device comprising:
a chamber having a proximate end configured to attach to a digital imaging device, a distal end comprising a wall, and a sample holder section located between the proximate end and the distal end, the sample holder section being configured to receive a sample, the chamber being configured to receive light; and
a light source configured to radiate light within the chamber, the light passing through the sample holder section and being incident on an imaging sensor of the digital imaging device when the chamber is attached to the digital imaging device, the digital imaging device being configured to record hologram information associated with the sample in the sample holder section, wherein the light source includes
a light emitting device for radiating light; and
a light manipulating device located in the path of the light to manipulate the light prior to the light passing through the sample.

11. A digital imaging apparatus configured for digital holography comprising:
a digital camera comprising a body and an imaging sensor disposed therein to convert light into an electric charge; and
a holography attachment device configured to attach to the body, the holography attachment device configured to hold a sample and through which light is passed, the light radiating through a sample and impinging on the imaging sensor when the holography attachment device is attached to the camera body, thereby enabling the imaging sensor to record two-dimensional hologram data associated with the sample.

12. The digital imaging apparatus of claim 11, wherein the digital camera is at least one of an SLR camera, a point-and-shoot camera, and a cell phone-based camera.

13. The digital imaging apparatus of claim 11, wherein the digital camera converts the two-dimensional hologram data to three-dimensional image data using a reconstruction technique.

14. The digital imaging apparatus of claim 13, wherein the digital camera displays the three-dimensional image.

15. The digital imaging apparatus of claim 11, further comprising a computing device, the computing device configured to receive the two-dimensional hologram data from the digital camera and convert the two-dimensional hologram data to a three-dimensional image using a reconstruction technique.

16. The digital imaging apparatus of claim 11, wherein the holography attachment device comprises:
a chamber having a proximate end configured to attach to the digital camera, a distal end comprising a wall, and a sample holder section located between the proximate end and the distal end, the sample holder section being configured to receive the sample; and
a light source configured to radiate light within the chamber, the light passing through the sample holder section and impinging on the imaging sensor when the chamber is attached to the digital camera, thereby enabling the digital imaging device to record hologram information associated with the sample in the sample holder section.

17. The digital imaging apparatus of claim 16, wherein the light source comprises:
 a light emitting device to radiate light; and
 a light manipulating device located in the path of the light to manipulate the light prior to the light passing through the sample holding section.

18. A method of observing hologram data associated with a sample using a digital imaging device comprising:
 attaching a holography attachment device to the digital imaging device; and
 recording a two-dimensional hologram associated with the sample in response to light passing through a sample and impinging upon an image sensor, wherein attaching of the holography attachment device comprises securing the holography attachment device to an off-the-shelf digital camera in place of the lens.

19. The method of claim 18, wherein the holography attachment device is secured over a lens of the off-the-shelf-digital camera.

20. The method of claim 18, further comprising constructing a three-dimensional image from the two-dimensional hologram data.

21. The method of claim 20, further comprising rendering the three-dimensional image on a display.

* * * * *